United States Patent
Ueno (10) Patent No.: US 10,739,767 B2
(45) Date of Patent: Aug. 11, 2020

(54) OPERATION CONTROL APPARATUS AND CONTROL METHOD

(71) Applicant: TOYOTA JIDOSHA KABUSHIKI KAISHA, Toyota-shi, Aichi-ken (JP)

(72) Inventor: Koki Ueno, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 326 days.

(21) Appl. No.: 15/877,752

(22) Filed: Jan. 23, 2018

(65) Prior Publication Data
US 2018/0217592 A1 Aug. 2, 2018

(30) Foreign Application Priority Data
Feb. 1, 2017 (JP) .................................. 2017-016970

(51) Int. Cl.
| | |
|---|---|
| *G05D 1/00* | (2006.01) |
| *B60W 10/18* | (2012.01) |
| *B60W 50/08* | (2020.01) |
| *B60W 50/035* | (2012.01) |
| *B60W 50/00* | (2006.01) |

(52) U.S. Cl.
CPC ......... *G05D 1/0061* (2013.01); *B60W 10/182* (2013.01); *B60W 50/035* (2013.01); *B60W 50/08* (2013.01); *B60W 2050/0096* (2013.01); *G05D 2201/0213* (2013.01)

(58) Field of Classification Search
CPC ........ G05D 1/0061; G05D 2201/0213; B60W 50/035; B60W 50/08; B60W 10/182; B60W 2050/0096; B60W 30/182; F16H 63/3416

USPC ............................................................ 701/23
See application file for complete search history.

(56) References Cited

U.S. PATENT DOCUMENTS

| | | | |
|---|---|---|---|
| 5,906,645 A * | 5/1999 | Kagawa | B60T 7/12 |
| | | | 701/23 |
| 8,814,752 B2 * | 8/2014 | Kitaori | F16H 63/3466 |
| | | | 477/99 |
| 8,874,301 B1 | 10/2014 | Rao et al. | |
| 9,523,984 B1 | 12/2016 | Herbach et al. | |

(Continued)

FOREIGN PATENT DOCUMENTS

| | | |
|---|---|---|
| JP | H09-222922 A | 8/1997 |
| JP | 2014-106854 A | 6/2014 |

(Continued)

*Primary Examiner* — Jonathan M Dager
*Assistant Examiner* — Jean W Charleston
(74) *Attorney, Agent, or Firm* — Oliff PLC (57) ABSTRACT

An operation control apparatus that controls a changeover from an automatic operation mode in which a vehicle is automatically operated to a manual operation mode in which the vehicle is manually operated, the vehicle includes a parking lock mechanism, and a sensor, the operation control apparatus includes an electronic control unit configured to: i) control the vehicle such that the vehicle is automatically operated, based on information received from the sensor; ii) determine whether or not a first condition is established; and iii) activate the parking lock mechanism, and change over an operation mode of the vehicle from the automatic operation mode to the manual operation mode after establishing the parking lock state, when the first condition is not established. The first condition is that the automatic operation mode can be continued.

5 Claims, 4 Drawing Sheets

(56) References Cited

U.S. PATENT DOCUMENTS

| | | | |
|---|---|---|---|
| 2011/0241862 A1* | 10/2011 | Debouk | B60W 50/038 |
| | | | 340/439 |
| 2012/0041661 A1* | 2/2012 | Kaneko | B60T 1/062 |
| | | | 701/70 |
| 2015/0134178 A1 | 5/2015 | Minoiu-Enache | |
| 2015/0291134 A1* | 10/2015 | Kamo | B60T 7/12 |
| | | | 701/70 |
| 2015/0321656 A1* | 11/2015 | Nishikawa | B60K 6/365 |
| | | | 192/219.4 |
| 2016/0298758 A1 | 10/2016 | Fujiyoshi et al. | |
| 2017/0088144 A1* | 3/2017 | Shibata | B60W 10/20 |
| 2017/0129465 A1* | 5/2017 | Ozawa | B60T 1/005 |
| 2019/0382015 A1* | 12/2019 | Niu | B60W 30/09 |

FOREIGN PATENT DOCUMENTS

| | | | |
|---|---|---|---|
| JP | 2016-097873 A | 5/2016 | |
| JP | 2016-199104 A | 12/2016 | |
| JP | 2016-200986 A | 12/2016 | |

* cited by examiner

OPERATION CONTROL APPARATUS AND CONTROL METHOD

INCORPORATION BY REFERENCE

The disclosure of Japanese Patent Application No. 2017-016970 filed on Feb. 1, 2017 including the specification, drawings and abstract is incorporated herein by reference in its entirety:

BACKGROUND

1. Technical Field

The disclosure relates to an operation control apparatus and control method which control the changeover from an automatic operation mode in which a vehicle is automatically operated to a manual operation mode in which the vehicle is manually operated.

2. Description of Related Art

Conventionally, there is proposed a control method for making a changeover from an automatic operation mode in which a vehicle is automatically operated to a manual operation mode in which the vehicle is manually operated (e.g., Japanese Patent Application Publication No. 2016-97873 (JP 2016-97873 A)). In the control method described in Japanese Patent Application Publication No. 2016-97873 (JP 2016-97873 A), a changeover from the automatic operation mode to the manual operation mode is restrained from being made against a driver's intention, by making a changeover from the automatic operation mode, to the manual operation mode when it is determined that a steering unit or the like of the vehicle has been maneuvered by the driver.

SUMMARY

By the way, due to a system requirement ascribable to a deterioration in the running environment of the vehicle resulting from fog or the like, a malfunction of a vehicle component such as a sensor or the like, etc., the continuation of automatic operation may become difficult. In this case, a changeover from the automatic operation mode to the manual operation mode needs to be made independently of the driver's operation maneuver.

However, the conventional control method as described in Japanese Patent Application Publication No. 2016-97873 (JP 2016-97873 A) has a problem in that the driver cannot be made to definitely recognize the emergence of a situation that requires a changeover to the manual operation mode. Besides, there is a problem in that the driver is forced to perform manual operation despite the lack of his or her intention to do so, for example, when the driver is not ready yet.

The disclosure has been made in view of the foregoing. The disclosure provides an operation control apparatus and control method which allow a driver to perform manual operation after the driver definitely recognizes that a changeover to a manual operation mode has been made, when the continuation of an automatic operation mode becomes impossible due to a system requirement ascribable to a deterioration in the running environment of a vehicle, a malfunction of a vehicle component or the like, and that can restrain the driver from being forced to perform manual operation despite the lack of his or her intention to do so.

An operation control apparatus according to one aspect of the disclosure is an operation control apparatus that controls a changeover from an automatic operation mode in which a vehicle is automatically operated to a manual operation mode in which the vehicle is manually operated. The vehicle includes a parking lock mechanism that establishes a parking lock state where a driving wheel of the vehicle is prevented from rotating, and a sensor configured to transmit information indicating a running environment of the vehicle and an operation state of the vehicle. The operation control apparatus includes an electronic control unit configured to; i) control the vehicle such that the vehicle is automatically operated, based on the information received from the sensor; ii) determine whether or not a first condition is established; and iii) activate the parking lock mechanism, and change over an operation mode of the vehicle from the automatic operation mode to the manual operation mode after establishing the parking lock state, when the first condition is not established. The first condition is that the automatic operation mode can be continued. An operation control apparatus according to one aspect of the disclosure is an operation control method that controls a changeover from an automatic operation mode in which a vehicle is automatically operated to a manual operation mode in which the vehicle is manually operated. The vehicle includes a parking lock mechanism that establishes a parking lock state where a driving wheel of the vehicle is prevented from rotating, a sensor configured to transmit information indicating a running environment of the vehicle and an operation state of the vehicle, and an electronic control unit. The operation control method includes: i) performing by the electronic control unit, control in such that the vehicle automatically drives, based on the information received from the sensor; ii) determining, by the electronic control unit, whether or not a first condition is established; iii) activating, by the electronic control unit, the parking lock mechanism, and changing over an operation mode of the vehicle from the automatic operation mode to the manual operation mode after establishing the parking lock state, when the first condition is not established. The first condition is that the automatic operation mode can be continued.

The electronic control unit may be configured to: iv) determine, based on the information, whether or not a second condition is established, when the first condition is not established; and v) activate the parking lock mechanism when the second condition is established. The second condition may be that a vehicle speed of the vehicle is equal to or lower than a predetermined vehicle speed.

The electronic control unit may be configured to: vi) determine, based on the information, whether or not a third condition is established, when the first condition is not established; vii) change over the operation mode of the vehicle from the automatic operation mode to the manual operation mode, when the third condition is established. The third condition may be that an operation maneuver is carried out by a driver.

The electronic control unit may be configured to viii) control the vehicle such that the vehicle decelerates such that the vehicle speed becomes equal to or lower than the predetermined vehicle speed, when a forth condition is established, and the forth condition may be that the vehicle speed is higher than the predetermined vehicle speed.

The electronic control unit may be configured to: ix) control the vehicle in a neutral state, and activate the parking lock mechanism in the neutral state after the vehicle speed becomes equal to or lower than the predetermined vehicle speed, when the forth condition is established; and the neutral state may be a state that transmission of motive power between a motive power source of the vehicle and the driving wheel may be interrupted.

The electronic control unit may be configured to: xi) determine, based on the information, whether or not a fifth condition is established, when the forth condition is established; xii) control the vehicle in the neutral state, and activate the parking lock mechanism in the neutral state after the vehicle becomes speed equal to or lower than the predetermined vehicle speed, when the fifth condition is not established; xiii) control the vehicle in a motive power transmission state, and activate the parking lock mechanism in the motive power transmission state after the vehicle speed become equal to or lower than the predetermined vehicle speed, when the fifth condition is established. The fifth condition is that the vehicle is on a slope. The motive power transmission state is a state that motive power is transmitted between the motive power source and the driving wheel.

According to the disclosure, when the continuation of the automatic operation mode becomes impossible due to a system requirement ascribable to a deterioration in the running environment of the vehicle, a malfunction of a vehicle component or the like, a changeover from the automatic operation mode to the manual operation mode is made after establishing the parking lock state. As a result, in order to start the vehicle, the driver is required, with a will of his or her own, to cancel the parking lock state. Thus, the driver can perform operation after definitely recognizing that the manual operation mode has been established. Also, the driver can be prevented from being forced to perform manual operation despite the lack of his or her intention to do so.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
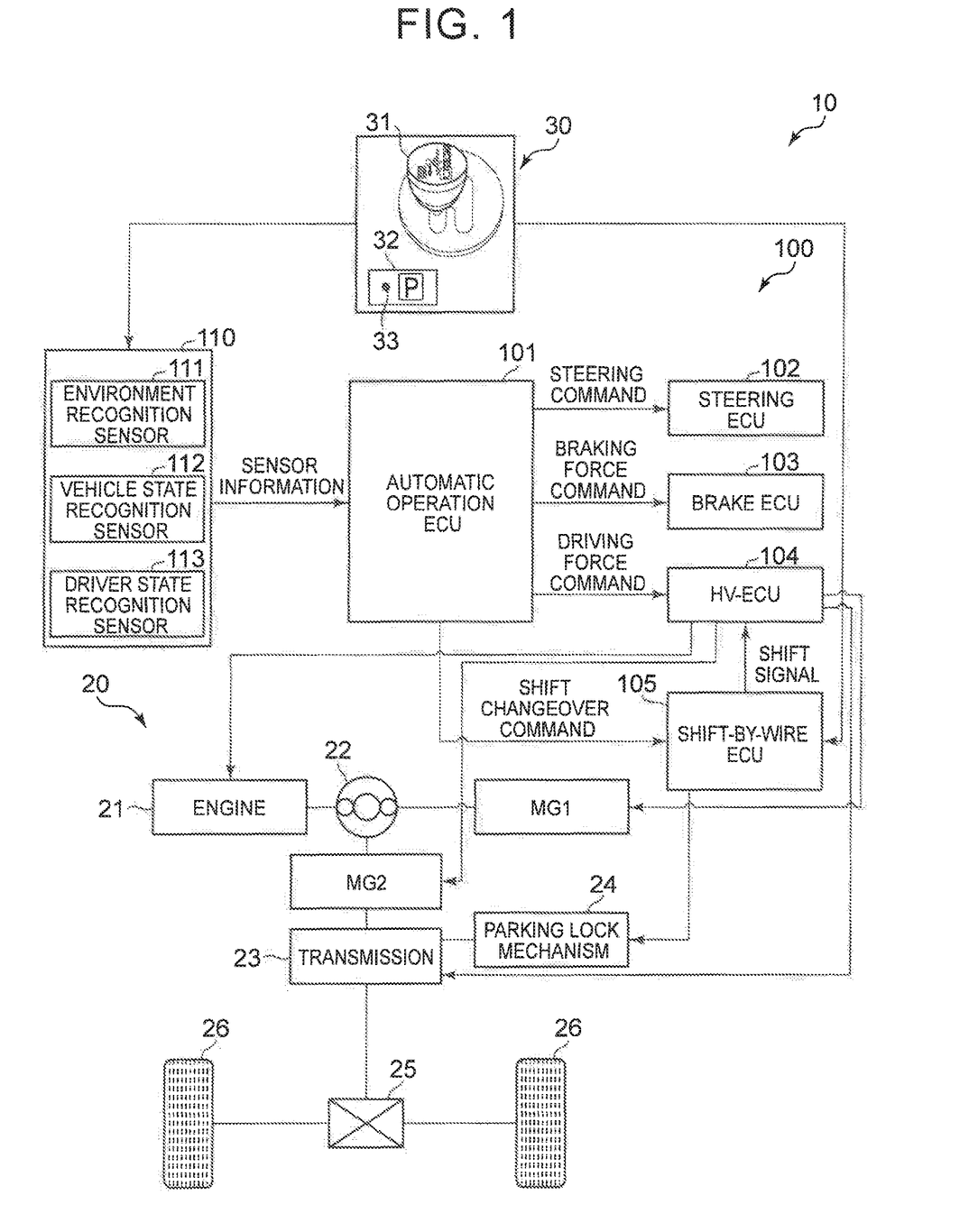
FIG. 1 is a block diagram schematically exemplifying the configuration of a vehicle to which the disclosure is applied and the configuration of an operation control apparatus according to the disclosure.

FIG. 1 is a block diagram schematically exemplifying the configuration of a vehicle to which the disclosure is applied and the configuration of an operation control apparatus according to the disclosure. A vehicle 10 that is equipped with a vehicle drive device 20 that drives driving wheels (wheels) 26, a shift maneuver device 30 for making a changeover in shift position, and an operation control apparatus 100 is shown in FIG. 1. As shown in FIG. 1, the vehicle drive device 20 is equipped with an engine 21 that is an internal combustion engine serving as a driving force source for running, a motive power split mechanism 22 that is connected to an output shaft of the engine 21, a first rotating electrical machine MG1 and a second rotating electrical machine MG2 that are connected to the motive power split mechanism 22, a transmission 23, a parking lock mechanism 24, and a differential gear device 25 that is connected to the transmission 23. Besides, the shift maneuver device 30 is equipped with a shift lever 31, a parking switch 32, and a parking position indicator 33. Furthermore, the operation control apparatus 100 includes an automatic operation electronic control unit (ECU) 101 ("the control unit" in the disclosure), a steering ECU 102, a brake ECU 103, an 104, a shift-by-wire ECU 105, and a sensor unit 110.

Each of the first rotating electrical machine MG1 and the second rotating electrical machine MG2 is a motor-generator capable of functioning as an electric motor that generates a mechanical driving force from electric energy and capable of functioning as a generator that generates electric energy from a mechanical driving force. Each of the first rotating electrical machine MG1 and the second rotating electrical machine MG2 as the electric motor can function as a motive power source that generates a driving force for running in place of or in conjunction with the engine 21 as a main motive power source.

The motive power split mechanism 22 is a differential mechanism that is coupled to the engine 21 in such a manner as to enable the transmission of motive power, and is configured as a planetary gear device. The transmission 23 is a stepped automatic transmission that is provided between the motive power split mechanism 22 and the differential gear device 25 and that can change the speed ratio. The motive power split mechanism 22 and the transmission 23 transmit the motive power of the engine 21 to the driving wheels 26 via the differential gear device 25 and the like.

The parking lock mechanism 24 can selectively make a changeover between a parking lock state where the driving wheels 26 are prevented from rotating by locking a gear of the transmission 23 and a non-parking lock state where the driving wheels 26 are not prevented from rotating.

The shift lever 31 has maneuver positions including a neutral position (hereinafter referred to as an N position), a drive position (hereinafter referred to as a D position), a reverse position (hereinafter referred to as an R position), and a brake position (hereinafter referred to as a B position). The N position is a maneuver position for establishing a neutral state where motive power transmission paths between the motive power sources such as the engine 21, the first rotating electrical machine MG1, and the second rotating electrical machine MG2 and the driving wheels 26 are shut off. The D position is a forward running maneuver position for transmitting a driving force for moving the vehicle 10 forward to the driving wheels 26. The R position is a backward running maneuver position for transmitting a driving force for moving the vehicle 10 backward to the driving wheels 26. The B position is a deceleration forward running maneuver position for making the braking force larger than at the D position and reducing the speed of rotation of the driving wheels 26. The N position, the D position, the R position, and the B position are referred to as non-P positions. The shift lever 31 can be provided in the vicinity of, for example, a driver seat.

The parking switch 32 is designed to change over the shift position from one of the non-P positions to a parking position (hereinafter referred to as "a P position") through a maneuver carried out by the driver. The P position is a parking position at which parking lock for mechanically preventing the driving wheels 26 from rotating is carried out by activating the parking lock mechanism 24.

The parking position indicator 33 is lit up to indicate that the shift position is the P position, namely, that the parking lock mechanism 34 is active. For example, when the parking lock mechanism 34 is activated through a maneuver of the parking switch 32 carried out by the driver or an automatic maneuver carried out by the automatic operation ECU 101 that will be described later, the parking position indicator 33 is lit up.

The automatic operation ECU 101 can control automatic operation for automatically operating the vehicle. The automatic operation ECU 101 transmits a steering command, a braking force command, and a driving force command to the steering ECU 102, the brake ECU 103, and the HV-ECU 104 respectively, based on information acquired from the sensor unit 110. Besides, the automatic operation ECU 101 transmits a shift-by-wire changeover command to the shift-by-wire ECU 105. Furthermore, the automatic operation ECU 101 can control the changeover in operation mode between the automatic operation mode and the manual operation mode.

It should be noted herein that "automatic operation" refers to completely automatic operation for automatically controlling acceleration, braking, and steering of the vehicle altogether in the disclosure, but the disclosure is not limited thereto. Among acceleration, braking, and steering of the vehicle, at least acceleration and braking may be automatically controlled. "An automatically operated vehicle" according to the disclosure refers to those which perform, for example, automatic operation that always eliminates the need for monitoring, automatic parking/automatic departure with no driver present, valet parking for moving the vehicle in an unmanned manner to and from a parking lot based on a command issued by a terminal, and the like, and does not include those which perform automatic control exclusively for steering, for example, those which perform automatic control only in the case of lane keeping assist.

Besides, the automatic operation ECU 101 can determine, based on various pieces of information acquired from the sensor unit 110, whether or not automatic operation can be continued. The automatic operation ECU 101 determines that the automatic operation mode cannot be continued, for example, when an environment recognition sensor cannot be used in a surrounding situation (fog or the like), when a vehicle component such as a sensor or the like breaks down, etc.

The steering ECU 102 can control the maneuver of a steering wheel based on the steering command received from the automatic operation ECU 101.

The brake ECU 103 can control a brake mechanism based on the braking force command received from the automatic operation ECU 101.

The HV-ECU 104 can control the engine 21, the first rotating electrical machine MG1, the second rotating electrical machine MG2, and the transmission 23 based on the driving force command received from the automatic operation ECU 101.

The shift-by-wire ECU 105 can activate or deactivate the parking lock mechanism 24 to change over the shift position between the P position and the non-P positions, based on the shift changeover command received from the automatic operation ECU 101. Besides, the shift-by-wire ECU 105 transmits a shift signal indicating a current shift position to the HV-ECU 104 to cause the HV-ECU 104 to perform driving force control corresponding to a current shift position.

The sensor unit 110 includes an environment recognition sensor 111, a vehicle state recognition sensor 112, and a driver state recognition sensor 113, and outputs sensor information indicating a running environment of the vehicle and an operation state of the vehicle based on information obtained from these sensors 111 to 113. The sensor information includes various pieces of information required for acceleration, braking and/or steering in automatic operation.

The environment recognition sensor 111 can output information obtained by recognizing, for example, other vehicles, obstacles, pedestrians, lanes, parking section lines, and the like to the automatic operation ECU 101. The environment recognition sensor 111 can include, for example, sensors for detecting a distance to an object through the use of a millimeter-wave radar, recognizing an image through the use of a camera, etc.

The vehicle state recognition sensor 112 can output information obtained by recognizing vehicle states such as a vehicle speed, an accelerator depression amount, a brake depression amount, a shift position, a steering angle of the steering wheel, an angle of inclination of the vehicle and the like to the automatic operation ECU 101. The vehicle state recognition sensor 112 can include various sensors, for example, a vehicle speed sensor, an acceleration sensor, and the like.

The driver state recognition sensor 113 can output information obtained by recognizing driver states, for example, the load applied to a seat, whether or not the driver has a seat belt fastened, the line of sight of the driver, the posture of the driver and the like to the automatic operation ECU 101.

Figure 2:
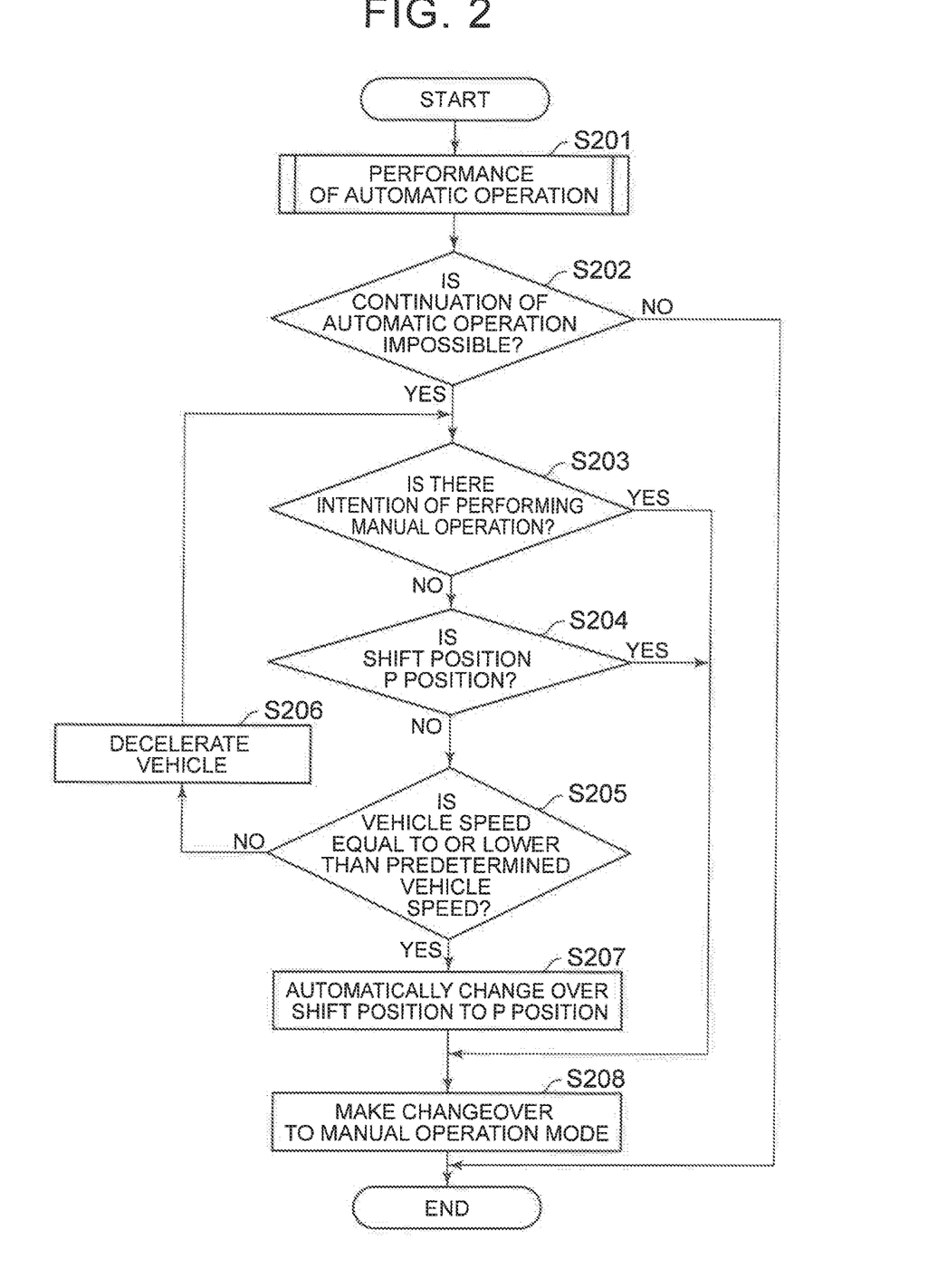
FIG. 2 is a view showing the processing flow of an operation control apparatus according to the first embodiment of the disclosure.

FIG. 2 shows the processing flow of the operation control apparatus according to the first embodiment of the disclosure. The automatic operation ECU 101 of the operation control apparatus 100 repeatedly executes the following processes shown in FIG. 2 in the automatic operation mode.

In step (the word "step" will be referred to hereinafter as "S") 201, automatic operation is performed. Subsequently in S202, it is determined whether or not the automatic operation mode can be continued. If it is determined in S202 that the automatic operation mode can be continued, the automatic operation mode is simply continued. If it is determined in S202 that the automatic operation mode cannot be continued, a transition to S203 is made.

In S203, it is determined, based on sensor information, whether or not an operation maneuver such as the maneuver of the steering wheel, the accelerator, the brake, the shift lever or the like is carried out by the driver (see Japanese Patent Application Publication No. 2016-97873 (JP 2016-97873 A) as to a method of making this determination). If it is determined in S203 that an operation maneuver is carried out by the driver, a transition to S208 is made. If it is determined in S203 that no operation maneuver is carried out by the driver, a transition to S204 is made.

In S204, it is determined whether or not the shift position is the P position. If it is determined in S204 that the shift position is the P position, a transition to S208 is made. If it is determined in S204 that the shift position is not the P position, a transition to S205 is made.

In S205, it is determined whether or not the vehicle speed is equal to or lower than a predetermined vehicle speed. It should be noted herein that "the predetermined vehicle speed" may be set equal to 0 km/h (the vehicle is stopped) or equal to or lower than 3 km/h, namely, the upper limit of the vehicle speed at which a changeover to the P range can be made. However, these values are exemplifications, and differ depending on the type of the vehicle (the same holds true for the following second and third embodiments of the disclosure). If it is determined in S205 that the vehicle speed is equal to or lower than the predetermined vehicle speed, a transition to S207 is made. If it is determined in. S205 that the vehicle speed is not equal to or lower than the predetermined vehicle speed, a transition to S206 is made.

In S206, the vehicle 10 is decelerated such that the vehicle speed becomes equal to or lower than the aforementioned predetermined vehicle speed. In S206, arbitrary deceleration means, for example, an automatic brake, an engine brake that rotationally drives the engine 21 by the driving wheels 26, a regenerative brake that rotationally drives the second rotating electrical machine MG2 by the driving wheels 26 to cause the second rotating electrical machine MG2 to function as a generator (regenerate the second rotating electrical machine MG2), or the like can be used. After the vehicle 10 is decelerated, a return to S203 is made and the determinations in S203 to S205 are made again. If it is determined in S205 that the vehicle speed is equal to or lower than the predetermined vehicle speed, a transition to S207 is made.

In S207, the shift position is automatically changed over to the P position. That is, the parking lock mechanism 24 is activated to establish the parking lock state where the gear of the transmission 23 is locked. At this time, the parking position indicator 33 is also lit up. After that, a transition to S208 is made.

In S208, the operation mode of the vehicle 10 is changed over from the automatic operation mode to the manual operation mode.

In the operation control apparatus according to the first embodiment of the disclosure, when the continuation of the automatic operation mode becomes impossible due to a system requirement ascribable to a deterioration in the running environment of the vehicle, a malfunction of a vehicle component or the like, a changeover from the automatic operation mode to the manual operation mode is made after establishing the parking lock state where the parking lock mechanism 24 of the vehicle 10 is active. As a result, in order to start the vehicle 10, the driver is required, with a will of his or her own, to maneuver the shift lever 31 to change over the shift position from the P position to a running position and thus to cancel the parking lock state. Therefore, the driver can operate the vehicle after definitely recognizing that the manual operation mode has been established.

Figure 3:
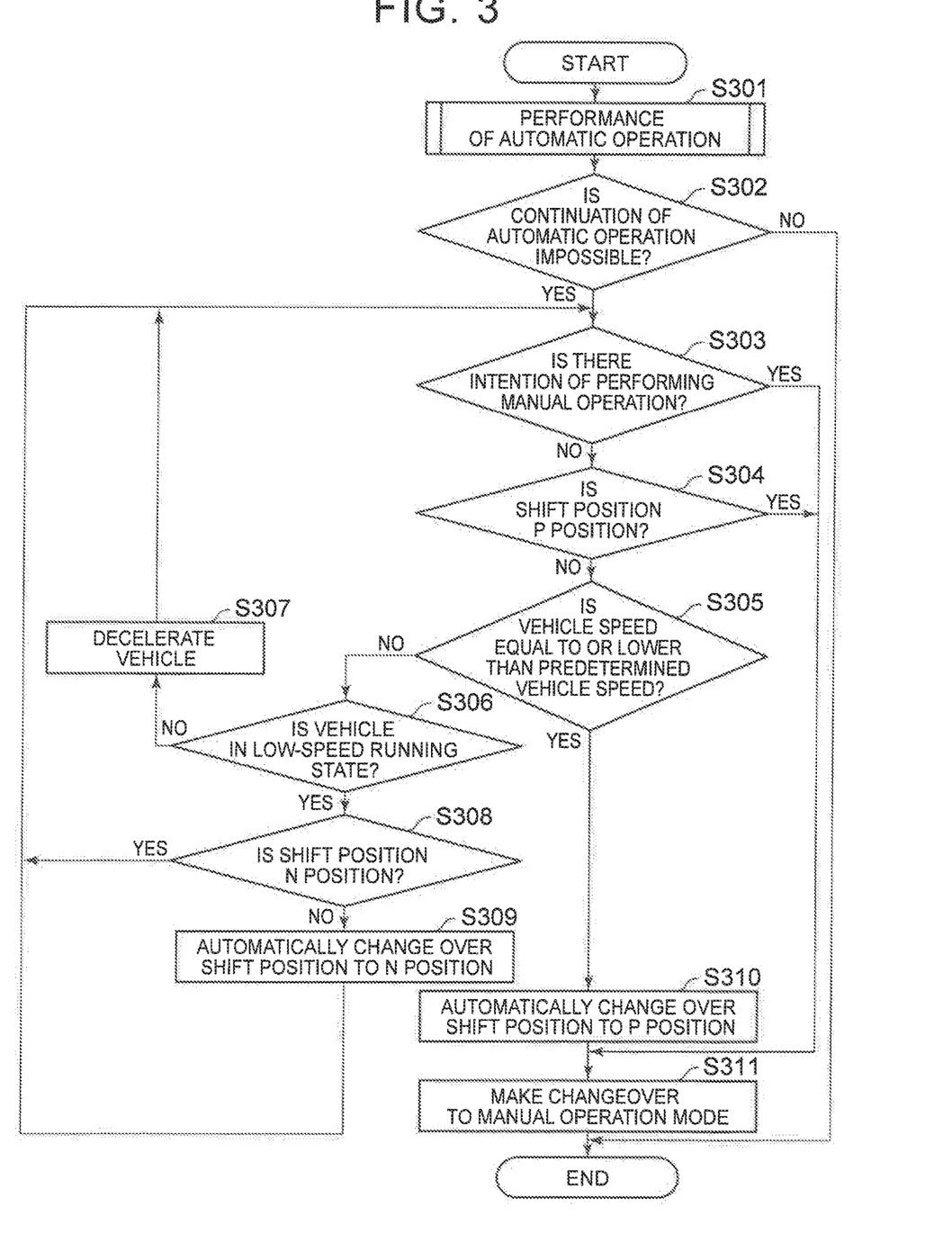
FIG. 3 is a view showing the processing flow of an operation control apparatus according to the second embodiment of the disclosure.

FIG. 3 shows the processing flow of the operation control apparatus according to the second embodiment of the disclosure. The automatic operation ECU 101 of the operation control apparatus 100 repeatedly executes the following processes shown in FIG. 3, in the automatic operation mode.

In S301, automatic operation is performed. Subsequently in S302, it is determined whether or not the automatic operation mode can be continued. If it is determined in S302 that the automatic operation mode can be continued, the automatic operation mode is simply continued. If it is determined in S302 that the automatic operation mode cannot be continued, a transition to S303 is made.

In S303 as well as S203 of the first embodiment of the disclosure, it is determined whether or not an operation maneuver is carried out by the driver. :If it is determined in S303 that an operation maneuver is carried out by the driver, a transition to S311 is made. If it is determined in S303 that no operation maneuver is carried out by the driver, a transition to S304 is made.

In S304, it is determined whether or not the shift position is the P position. If it is determined in S304 that the shift position is the P position, a transition to S311 is made. If it is determined in S304 that the shift position is not the P position, a transition to S305 is made.

In S305, it is determined whether or not the vehicle speed is equal to or lower than the aforementioned predetermined vehicle speed. If it is determined in S305 that the vehicle speed is equal to or lower than the predetermined vehicle speed, a transition to S310 is made. If it is determined in S305 that the vehicle speed is not equal to or lower than the predetermined vehicle speed, a transition to S306 is made.

In S306, it is determined whether or not the vehicle 10 is in a low-speed running state. It should be noted herein that "low-speed running" means running at a vehicle speed equal to or lower than, for example, 11 km/h. If it is determined in S306 that the vehicle 10 is not in the low-speed running state, a transition to S307 is made. In S307 as well as S206 of the first embodiment of the disclosure, the vehicle 10 is decelerated. Thus, the vehicle 10 enters the low-speed running state. After that, a return to S303 is made, and the determinations in S303 to S306 are made again.

If it is determined in S306 that the vehicle 10 is in the low-speed running state, a transition to S308 is made, and it is determined whether or not the shift position is the N position. If the shift position is not the N position, a transition to S309 is made. If the shift position is the N position, a return to S303 is made, and the determinations in S303 to S305 are made again.

In S309, the shift position is changed over to the N position. Thus, the vehicle 10 coasts, and the vehicle speed gradually falls. After that, a return to S303 is made, and the determinations in S303 to S305 are made again.

If it is determined in S305 that the vehicle speed is equal to or lower than the predetermined vehicle speed, the shift position is automatically changed over to the P position in S310. That is, the parking lock mechanism 24 is activated to establish the parking lock state where the gear of the transmission 23 is locked. At this time, the parking position indicator 33 is also lit up. After that, a transition to S311 is made.

In S311, the operation mode of the vehicle is changed over from the automatic operation mode to the manual operation mode.

In the second embodiment of the disclosure, the control of the shift position shown below in Table 1 is performed from the shift position and the speed range. It should be noted herein that v denotes the vehicle speed (km/h).

TABLE 1

| | v = 0 to 3 (stopped) | 0 to 3 < v ≤ 11 (low-speed running) | v > 11 (running) |
|---|---|---|---|
| P position | Maintenance of current position | — | — |
| D position, R position, B position | Changeover to P position | Changeover to N position | Maintenance of current position |
| N position | Changeover to P position | Maintenance of current position | Maintenance of current position |

With the operation control apparatus according to the second embodiment of the disclosure, after the vehicle speed is made equal to or lower than the predetermined vehicle speed by changing over the shift position to the N position, the shift position is changed over to the P position. That is, the parking lock mechanism 34 is activated in the neutral state where the transmission of motive power between the motive power source of the vehicle 10 and the driving wheels 26 is interrupted. Thus, when the parking lock mechanism 34 is activated to prevent the driving wheels 26 from rotating, the transmission of motive power between the motive power source and the driving wheels 26 is interrupted, so the shock resulting from activation of the parking lock mechanism 34 can be suppressed.

Figure 4:
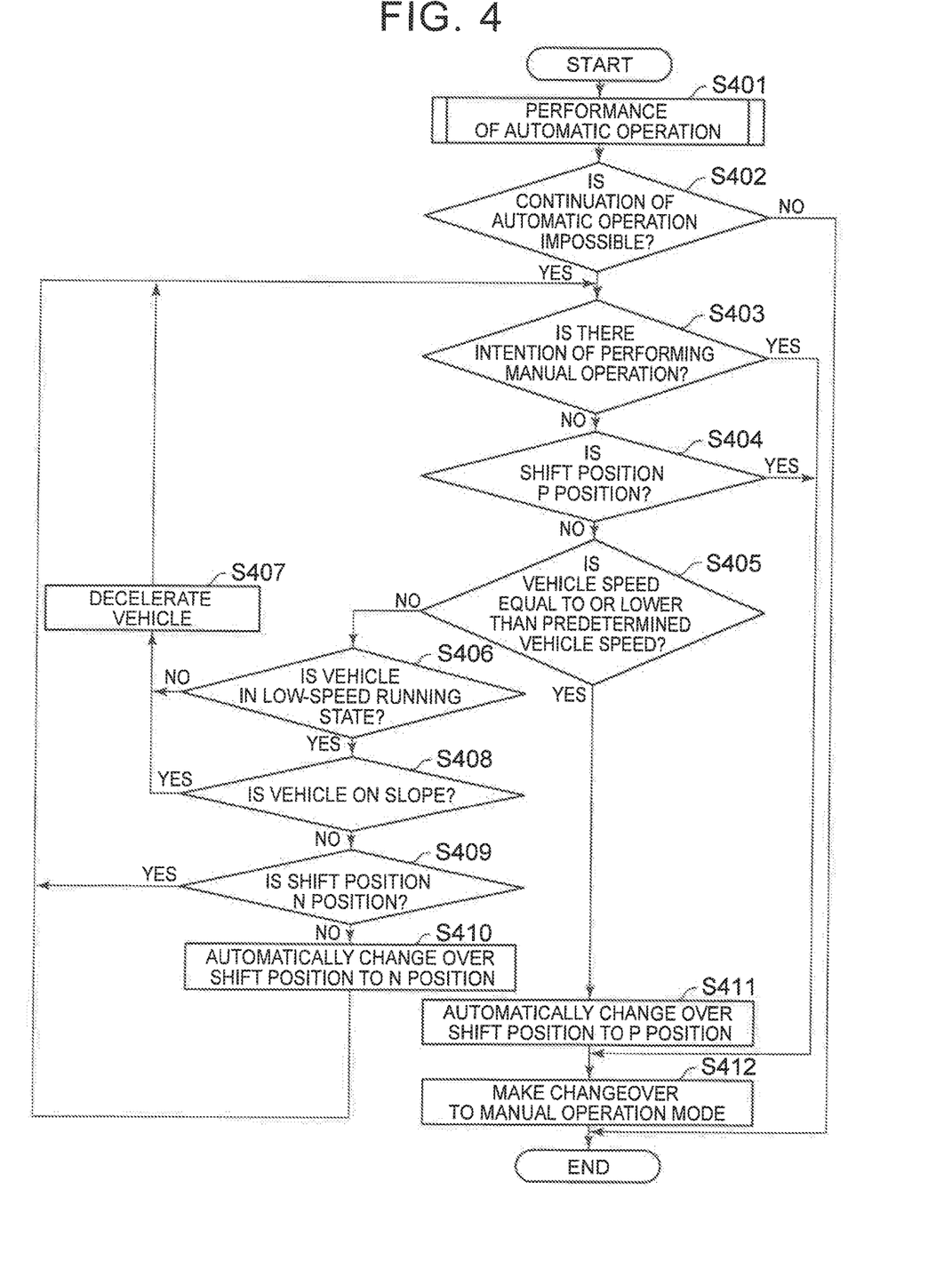
FIG. 4 is a view showing the processing flow of an operation control apparatus according to the third embodiment of the disclosure.

FIG. 4 shows the processing flow of the operation control apparatus according to the third embodiment of the disclosure. The automatic operation ECU 101 of the operation control apparatus 100 repeatedly executes the following processes shown in FIG. 4, in the automatic operation mode.

In S401, automatic operation is performed. Subsequently in S402, it is determined whether or not the automatic operation mode can be continued. If it is determined in S402 that the automatic operation mode can be continued, the automatic operation mode is simply continued. If it is determined in S402 that the automatic operation mode cannot be continued, a transition to S403 is made.

In S403 as well as S203 of the first embodiment of the disclosure (S303 of the second embodiment of the disclosure), it is determined whether or not an operation maneuver is carried out by the driver. If it is determined in S403 that an operation maneuver is carried out by the driver, a transition to S412 is made. If it is determined in S403 that no operation maneuver is carried out by the driver, a transition to S404 is made.

In S404, it is determined whether or not the shift position is the P position. If it is determined in S404 that the shift position is the P position, a transition to S412 is made. If it is determined in S404 that the shift position is not the P position, a transition to S405 is made.

In S405, it is determined whether or not the vehicle speed is equal to or lower than the aforementioned predetermined vehicle speed. If it is determined in S405 that the vehicle speed is equal to or lower than the predetermined vehicle speed, a transition to S411 is made. If it is determined in S405 that the vehicle is not equal to or lower than the predetermined vehicle speed, a transition to S406 is made.

In S406 as well as S306 of the second embodiment of the disclosure, it is determined whether or not the vehicle 10 is in the low-speed running state. If it is determined in S406 that the vehicle 10 is not in the low-speed running state, a transition to S407 is made. In S407 as well as S206 of the first embodiment of the disclosure (S307 of the second embodiment of the disclosure), the vehicle 10 is decelerated. After that, a return to S403 is made, and the determinations in S403 to S406 are made again.

If it is determined in S406 that the vehicle 10 is in the low-speed running state, a transition to S408 is made. In S408, it is determined, based on sensor information indicating a state of inclination of the vehicle 10, whether or not the vehicle 10 is on a slope. If it is determined in S408 that the vehicle 10 is on a slope, a transition to S407 is made. If it is determined in S408 that the vehicle 10 is not on a slope, a transition to S409 is made.

In S409, it is determined whether or not the shift position is the N position. If the shift position is not the N position, a transition to S410 is made. If the shift position is the N position, a return to S403 is made, and the determinations in S303 to S305 are made again.

In S410, the shift position is automatically changed over to the N range. Thus, the vehicle 10 coasts, and the vehicle speed gradually falls. After that, a return to S403 is made, and the determinations in S403 to S405 are made again.

If it is determined in S405 that the vehicle speed is equal to or lower than the predetermined vehicle speed, the shift position is automatically changed over to the P position in S411. That is, the parking lock mechanism 24 is activated to establish the parking lock state where the gear of the transmission 23 is locked. At this time, the parking position indicator 33 is also lit up. After that, a transition to S412 is made.

In S412, the operation mode of the vehicle is changed over from the automatic operation mode to the manual operation mode.

In the third embodiment of the disclosure, with the vehicle 10 on a slope, the control of the shift position shown below in Table 2 is performed from the shift position and the speed range.

TABLE 2

| | v = 0 to 3 (stopped) | 0 to 3 < v ≤ 11 (low-speed running) | v > 11 (running) |
|---|---|---|---|
| P position | Maintenance of current position | — | — |
| D position, R position, B position | Changeover to P position | Maintenance of current position | Maintenance of current position |
| N position | Changeover to P position | Maintenance of current position | Maintenance of current position |

With the operation control apparatus according to this third embodiment of the disclosure, when the vehicle 10 runs on a flat road, after the vehicle speed is made equal to or lower than the predetermined vehicle speed by changing over the shift position to the N position, the shift position is changed over to the P position. Accordingly, in this case as well as the case of the second embodiment of the disclosure, the shock resulting from activation of the parking lock mechanism 34 can be suppressed. Besides, with the vehicle 10 on a slope, after the vehicle speed is made equal to or lower than the predetermined vehicle speed by changing over the shift position to the N position, the vehicle 10 may slip down along the slope before the shift position is changed over to the P position, namely, before the parking lock mechanism 34 is activated to prevent the driving wheels 26 from rotating. With the operation control apparatus according to this third embodiment of the disclosure, while the vehicle 10 is on the slope, the shift position is changed over to the P position with motive power transmitted between the motive power source and the driving wheels 26. Thus, when the vehicle 10 runs on the slope, the parking lock mechanism 34 can be activated while restraining the vehicle 10 from slipping down along the slope.

Although the respective embodiments of the disclosure have been described above, the disclosure is not limited to these embodiments thereof, but can be appropriately subjected to various alterations, additions and the like. For example, a mechanism that prevents the driving wheels from rotating by locking the gear of the transmission has been exemplified as the parking lock mechanism. However, any mechanism can be used as long as the driving wheels can be prevented from rotating. Besides, a display device (not shown) may be configured to indicate that automatic operation cannot be continued when it is determined that automatic operation cannot be continued. Besides, the example in which the disclosure is applied to a hybrid vehicle has been shown above. However, the disclosure is applicable to any vehicle, such as a normal vehicle equipped with an engine, an electric vehicle or the like, as long as an automatic operation technology is adopted therein.

What is claimed is:

1. An operation control apparatus that controls a changeover from an automatic operation mode in which a vehicle is automatically operated to a manual operation mode in which the vehicle is manually operated, the vehicle including a parking lock mechanism that establishes a parking lock state where a driving wheel of the vehicle is prevented from rotating, and a sensor configured to transmit information indicating a running environment of the vehicle and an operation state of the vehicle, the operation control apparatus comprising
an electronic control unit configured to:
control the vehicle such that the vehicle is automatically operated, based on the information received from the sensor;
determine whether or not the automatic operation mode can be continued;
activate the parking lock mechanism, and change over an operation mode of the vehicle from the automatic operation mode to the manual operation mode after establishing the parking lock state, when the automatic operation mode cannot be continued;
determine, based on the information, whether or not a vehicle speed of the vehicle is equal to or lower than a predetermined vehicle speed, when the automatic operation mode cannot be continued;
activate the parking lock mechanism when the vehicle speed of the vehicle is equal to or lower than the predetermined vehicle speed;
control the vehicle such that the vehicle decelerates such that the vehicle speed becomes equal to or lower than the predetermined vehicle speed, when the vehicle speed is higher than the predetermined vehicle speed; and
control the vehicle in a neutral state, and activate the parking lock mechanism in the neutral state after the vehicle speed becomes equal to or lower than the predetermined vehicle speed, when the vehicle speed is higher than the predetermined vehicle speed; wherein
the neutral state is a state that transmission of motive power between a motive power source of the vehicle and the driving wheel is interrupted.

2. The operation control apparatus according to claim claim 1, wherein the electronic control unit is configured to:
determine, based on the information, whether or not an operation maneuver is carried out by a driver when the automatic operation mode cannot be continued; and
change over the operation mode of the vehicle from the automatic operation mode to the manual operation mode, when the operation maneuver is carried out by a driver.

3. The operation control apparatus according to claim 1, wherein
the electronic control unit is configured to:
determine, based on the information, whether or not the vehicle is on a slope, when the vehicle speed is higher than the predetermined vehicle speed;
control the vehicle in the neutral state, and activate the parking lock mechanism in the neutral state after the vehicle speed becomes equal to or lower than the predetermined vehicle speed, when the vehicle is on the slope;
control the vehicle in a motive power transmission state, and activate the parking lock mechanism in the motive power transmission state after the vehicle speed become equal to or lower than the predetermined vehicle speed, when the vehicle is on the slope;
wherein the motive power transmission state is a state that motive power is transmitted between the motive power source and the driving wheel.

4. An operation control method that controls a changeover from an automatic operation mode in which a vehicle is automatically operated to a manual operation mode in which the vehicle is manually operated, the vehicle including a parking lock mechanism that establishes a parking lock state where a driving wheel of the vehicle is prevented from rotating, a sensor configured to transmit information indicating a running environment of the vehicle and an operation state of the vehicle, and an electronic control unit, the operation control method comprising:
performing by the electronic control unit, control in such that the vehicle automatically drives, based on the information received from the sensor;
determining, by the electronic control unit, whether or not the automatic operation mode can be continued;
activating, by the electronic control unit, the parking lock mechanism, and changing over an operation mode of the vehicle from the automatic operation mode to the manual operation mode after establishing the parking lock state, when automatic operation mode cannot be continued;
determining, by the electronic control unit and based on the information, whether or not a vehicle speed of the vehicle is equal to or lower than a predetermined vehicle speed, when the automatic operation mode cannot be continued;
activating, by the electronic control unit, the parking lock mechanism when the vehicle speed of the vehicle is equal to or lower than the predetermined vehicle speed;
controlling, by the electronic control unit, the vehicle such that the vehicle decelerates such that the vehicle speed becomes equal to or lower than the predetermined vehicle speed, when the vehicle speed is higher than the predetermined vehicle speed; and
controlling, by the electronic control unit, the vehicle in a neutral state, and activating the parking lock mechanism in the neutral state after the vehicle speed becomes equal to or lower than the predetermined vehicle speed, when the vehicle speed is higher than the predetermined vehicle speed; wherein
the neutral state is a state that transmission of motive power between a motive power source of the vehicle and the driving wheel is interrupted.

5. The operation control method according to claim 4, further comprising determining, by the electronic control unit and based on the information, whether or not the vehicle is on a slope, when the vehicle speed is higher than the predetermined vehicle speed;
controlling, by the electronic control unit, the vehicle in the neutral state, and activating the parking lock mechanism in the neutral state after the vehicle speed becomes equal to or lower than the predetermined vehicle speed, when the vehicle is on the slope;
controlling, by the electronic control unit, the vehicle in a motive power transmission state, and activating the parking lock mechanism in the motive power transmission state after the vehicle speed become equal to or lower than the predetermined vehicle speed, when the vehicle is on the slope;
wherein the motive power transmission state is a state that motive power is transmitted between the motive power source and the driving wheel.

* * * * *